UNITED STATES PATENT OFFICE.

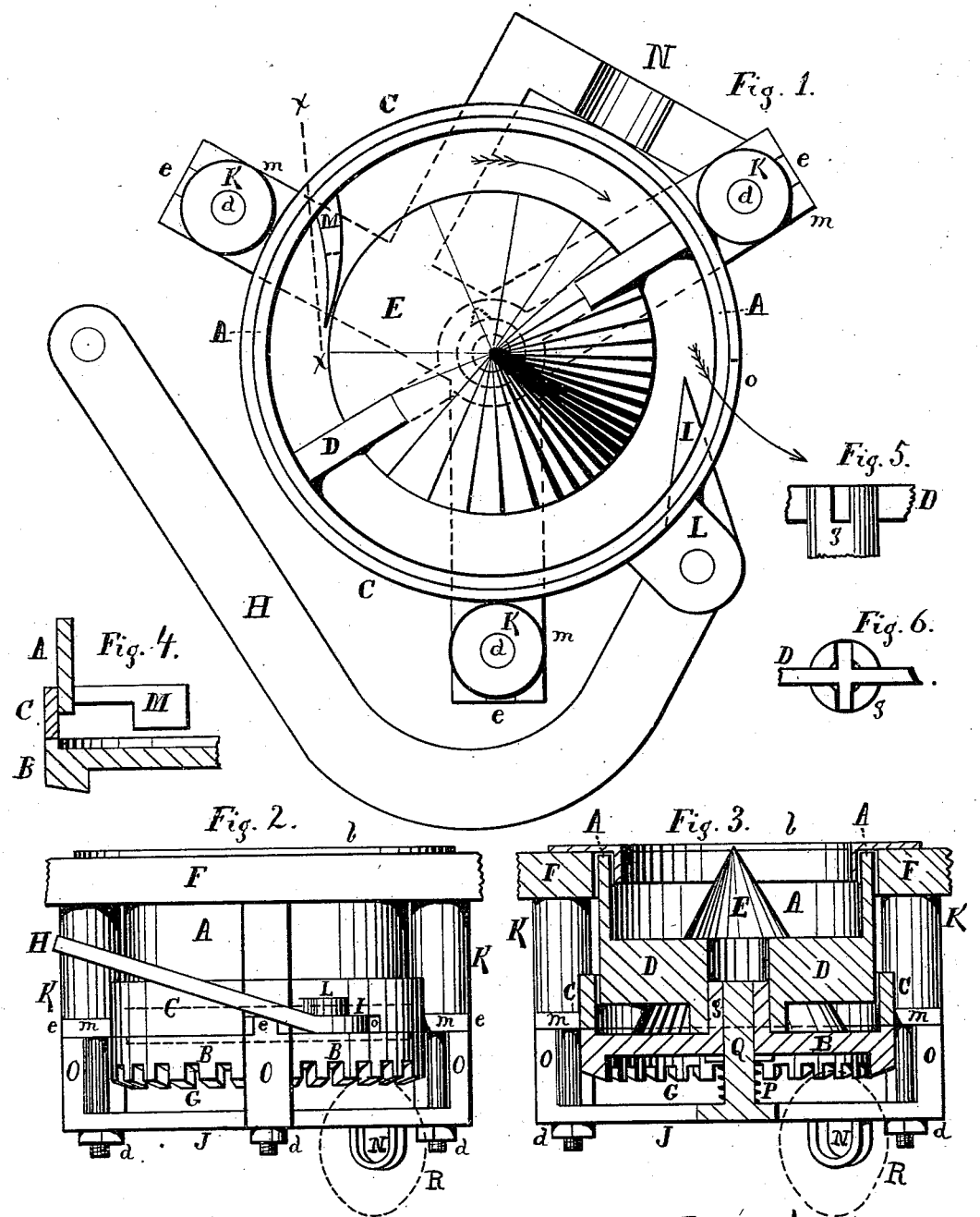

WALTER MARKS AND GILBERT JESSUP, OF HOPEWELL, NEW YORK; SAID JESSUP ASSIGNOR TO SAID MARKS.

IMPROVEMENT IN FEED-CUPS FOR FERTILIZER-DISTRIBUTERS.

Specification forming part of Letters Patent No. 213,053, dated March 11, 1879; application filed October 5, 1878.

*To all whom it may concern:*

Be it known that we, WALTER MARKS and GILBERT JESSUP, residents of Hopewell, Ontario county, New York, have invented an Improved Feed-Cup for Fertilizer-Distributers, of which the following is a specification:

Our invention relates to an improved feed-cup for fertilizer-distributers, designed to be used on any ordinary grain-drill, for the purpose of feeding into the drill-tube along with the grain a regular supply of the fertilizing material.

The object of our invention is to secure a steady and uniform discharge of the fertilizer, variable at the will of the operator, and to prevent the pasting or gumming up of the apparatus—a difficulty which arises from the nature of the material to be fed, and which has heretofore constituted a serious objection to the practical use of devices for feeding fertilizers.

Our invention consists in a rotary feed-cup having a narrow opening around it near its bottom, which opening is closed by a stationary ring surrounding the cup, and provided with a feed-opening and an adjustable gate.

Our invention also consists in the combination, with a rotary feed-cup provided with an opening near its bottom, and surrounded by a ring having a lateral feed-opening and a gate, of a rotary distributer or feeder within the cup; and, also, in the combination, with the said parts, of a distributing-cone placed within the feed-cup; and, also, in the combination, with the said parts, of a stationary arm located within the cup, and operating to force the fertilizer into the path of the gate; and, also, in the combination of our improved rotary feed-cup with a hopper for holding the fertilizer; and in the combination of the feed-cup and hopper and a plate attached to the latter to prevent the escape of the fertilizer.

Our invention also consists in the combination, with our improved feed-cup, of means for driving the same, and for securing the same in position, attached to the bottom of the hopper.

In the accompanying drawings our improved feed-cup for distributing fertilizers is shown.

Figure 1 is a view of a feed-cup embodying our improvements as seen from above, the hopper being removed. Fig. 2 is a side elevation, and Fig. 3 a central vertical section, of the same, shown in position as attached to the bottom of the hopper. Fig. 4 is a sectional view on the line $x$ $x$, Fig. 1, showing the stationary arm within the feed-cup for forcing the fertilizer into the path of the gate. Figs. 5 and 6 represent modifications of the method of connecting the feed-cup with its rotating bottom.

Our improved rotary feed-cup A consists of a rotating cylindrical shell and a bottom plate placed beneath it.

In the accompanying drawings our improved feed-cup is shown as consisting of a cylindrical shell, A, Figs. 1 and 2, and a bottom plate, B. D, Figs. 1 and 3, is the rotary distributer, which also acts as a connection between the feed-cup and its bottom plate, B.

F, Figs. 2 and 3, represents the bottom of the hopper, to which the feed-cup is attached by bolts $d$ $d$ $d$, passing through perforated standards K K. C is the stationary ring surrounding the opening between the feed-cup and its bottom, which opening is indicated by a dotted line in Fig. 2, and is shown in Fig. 3.

The ring C is provided with a lateral feed-opening, $o$, Figs. 1 and 2, into which projects the adjustable gate I, which is pivoted to a lug, L, on the ring C, and may be adjusted in position by the lever H. The lower edge of the ring C is fitted accurately to the revolving bottom plate, B, which is held in position against it by a spring, P, Fig. 3, surrounding a central stud, Q, Fig. 3, on the supporting-plate J, and on which stud the bottom plate, B, revolves.

The rotary bottom plate, B, is provided with a gear, G, by which motion is communicated to it from a pinion on a transverse shaft, supported in a suitable bearing, N, Figs. 2 and 3, formed on an arm of the supporting-plate, as shown in Fig. 1. The pinion on the transverse shaft is indicated by dotted lines R in Figs. 2 and 3. The transverse shaft is driven from the wheels of the grain-drill in any convenient manner.

The rotary bottom plate, B, is provided on its upper side with a circular recess. (Indicated by a dotted line in Fig. 2, and in full lines in the sectional views, Figs. 3 and 4.) A hub, $g$, Fig. 3, projects upward from the bottom plate, B, and receives a corresponding hub projecting downward from the distributer D, the two being connected together in any convenient manner.

The rotating distributer D consists of one or more radial arms, connecting the feed-cup shell with its bottom plate, B.

The three parts—the shell, the bottom plate, and distributer—may, if desired, be cast in one piece; but we prefer, for convenience, to construct them as herein shown.

In Fig. 1 the hub of the distributer is shown as fitting around the hub on the bottom plate, and is prevented from turning on it by a pin or a projection on the one fitting a notch in the other.

In Figs. 5 and 6 the distributer is shown constructed without a hub, but merely passing through slots on the hub of the plate B.

The feed-cup consists of a cylindrical shell, the lower edge of which rotates within or upon the stationary ring C, and its upper edge within an opening in the bottom of the hopper F. A circular plate, $b$, Figs. 2 and 3, is attached to the upper side of the bottom of the hopper, and prevents the fertilizing material from escaping between the hopper and feed-cup. A cone, E, Figs. 1 and 3, is placed within the feed-cup, and assists in the distribution of the fertilizer toward the feed-opening $o$ in the stationary ring C. This cone may be of sheet metal, and secured to the arms or the hub of the distributer in any convenient manner.

The supporting-plate J is provided with arms O O, which reach upward, and engage, by means of little projections $e$, with lugs $m$ on the ring C. The bolts $d$ pass through the plate J and the lugs $m$, and secure the feed-cup to the bottom of the hopper.

Inside the feed-cup, and between it and the lower edge of the cone E, is placed an inclined stationary arm, M, Figs. 1 and 4, secured to the ring C, and performing the function of forcing the fertilizer from the vicinity of the cone into the path of the gate I. The arm M is provided with a notch (see Fig. 4) on its under side, to allow the fertilizer to pass under it.

Neither the cone nor the arm is essential to the practical operation of our device for feeding fertilizers; but we prefer to use them.

From the foregoing description the mode of operating our improved feed-cup for distributing fertilizers will be readily understood. A hopper for holding the fertilizing material is attached to a grain-drill of any ordinary construction, and it is provided at its bottom with as many of our improved feed-cups as the drill has drill-tubes. The feed-cups are all revolved simultaneously by pinions on a cross-shaft meshing into the gears on the bottom plates of the feed-cups. The fertilizer drops from the hopper into the feed-cups, and is distributed by the rotating distributer D, and fed outward through the opening $o$ to fall into the drill-tube either directly or through a suitable spout in a regular and constant stream. The amount of the discharge is regulated by varying the speed at which the feed-cups revolve, and also by the gate I, which, when introduced farther into the opening $o$, will increase the rate of feed. The direction of the rotation of the feed-cup and the discharge from the opening $o$ are indicated in Fig. 1 by the arrows. The levers H of all the feed-cups in the machine should be connected together by a rod, so that the gates in all the feed-cups can be controlled by one movement.

It will be perceived from the foregoing description of our improved feed-cup that the fertilizer in passing through it comes in contact with no stationary surfaces over which it must slide, and on which it would adhere and paste up. Almost the whole of the interior of the cup revolves with the fertilizer, the only exception being the stationary ring C, against which, however, the fertilizer hardly comes in contact. The recess in the top of the bottom plate, B, prevents the fertilizer from clogging between the plate and the gate I.

We claim—

1. The rotating cylindrical feed-cup composed of the shell A and bottom plate, B, separated by a continuous opening, which is closed by the stationary ring C, having a lateral feed-opening and a gate, substantially as described.

2. The combination of the rotary feed-cup A, provided with an opening near its bottom surrounded by the stationary ring C, having a lateral feed-opening and a gate, and the rotating distributer D, substantially as described.

3. The combination of the rotary feed-cup A, stationary ring C, feed-opening $o$, gate I, and cone E, substantially as described.

4. The combination of the rotary feed-cup A, stationary ring C, feed-opening $o$, gate I, cone E, and rotating distributer D, substantially as described.

5. The combination of the rotary feed-cup A, stationary ring C, provided with a lateral feed-opening and a gate, I, and the arm M, arranged to force the fertilizer into the path of the gate, substantially as set forth.

6. The combination of the rotary feed-cup A, ring C, opening $o$, gate I, and hopper F, substantially as described.

7. The combination of the rotary feed-cup A, provided with a stationary ring, C, having a lateral feed-opening and a gate, and the hopper F and plate $b$, substantially as described.

8. The combination of the rotating feed-cup A, stationary ring C, provided with a feed-opening and a gate, and the bottom plate, B, and the gear G, substantially as set forth.

9. The combination of the rotating feed-cup A, stationary ring C, feed-opening $o$, gate I, gear G, supporting-plate J, and hopper F, substantially as set forth.

WALTER MARKS.
GILBERT JESSUP.

Witnesses:
S. L. SELDEN,
R. N. WARFIELD.